(12) United States Patent
Kinney et al.

(10) Patent No.: US 10,166,491 B2
(45) Date of Patent: *Jan. 1, 2019

(54) APPARATUS AND METHOD FOR EXTRACTING ORGANIC COMPOUNDS FROM PLANT MATERIAL USING CARBON DIOXIDE

(71) Applicants: Lisa F. Kinney, Laramie, WY (US); Geoffrey R. Kinney, LaPorte, CO (US); Peter Robinson, Olympia, WA (US); Scott A. Morton, Laramie, WY (US)

(72) Inventors: Lisa F. Kinney, Laramie, WY (US); Geoffrey R. Kinney, LaPorte, CO (US); Peter Robinson, Olympia, WA (US); Scott A. Morton, Laramie, WY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/003,755

(22) Filed: Jan. 21, 2016

(65) Prior Publication Data

US 2017/0015937 A1 Jan. 19, 2017

Related U.S. Application Data

(60) Provisional application No. 62/106,028, filed on Jan. 21, 2015.

(51) Int. Cl.
*B01D 1/00* (2006.01)
*B01D 11/02* (2006.01)
*C11B 9/02* (2006.01)

(52) U.S. Cl.
CPC ...... *B01D 11/0273* (2013.01); *B01D 11/0203* (2013.01); *B01D 11/0207* (2013.01);
(Continued)

(58) Field of Classification Search
CPC ................................................ B01D 11/0273
(Continued)

(56) References Cited

U.S. PATENT DOCUMENTS 4,153,063 A 5/1979 Roselius et al.
4,554,170 A 11/1985 Panzner et al.
(Continued)

FOREIGN PATENT DOCUMENTS

CN 1754431 4/2006

OTHER PUBLICATIONS

Arab-Baraghi et al, "A Simple Method for Preparation of Polymer Microcellular Foams by In Situ Generation of Supercritical Carbon Dioxide From Dry Ice," Iranian Polymer Journal 2014, vol. 23, Science and Research Branch, Department of Polymer, Department of Polymer Engineering, Islamic Azad University, 5 total pages.
(Continued)

*Primary Examiner* — Deborah D Carr
(74) *Attorney, Agent, or Firm* — Cochran Freund & Young LLC; Samuel M. Freund

(57) ABSTRACT

An apparatus for extracting organic compounds from plant materials using subcritical or supercritical carbon dioxide is described. The apparatus has a sealable pressure chamber into which carbon dioxide dry ice and the plant materials are inserted, the pressure chamber, once sealed, self-pressurizing as the container and contents are warmed to a chosen temperature, converting the solid $CO_2$ to liquid, or to a super-critical fluid as the temperature and pressure are raised above the Critical Point. The chamber can be rotated when subcritical $CO_2$ liquid is employed to improve mixing between the liquid and the plant material. After a suitable extraction time, the carbon dioxide solvent containing the extracted material is directed into a separator such that the carbon dioxide and extracted material can be effectively
(Continued)

separated, thereby avoiding significant quantities of viscous and waxy extracted materials remaining in the chamber and valves after the carbon dioxide solvent is warmed and allowed to exit the chamber.

4 Claims, 8 Drawing Sheets

(52) U.S. Cl.
CPC ...... *B01D 11/0219* (2013.01); *B01D 11/0292* (2013.01); *C11B 9/025* (2013.01)

(58) Field of Classification Search
USPC .......................................................... 554/8
See application file for complete search history.

(56) References Cited

U.S. PATENT DOCUMENTS

| | | | |
|---|---|---|---|
| 7,029,707 | B2 | 4/2006 | Gow et al. |
| 7,344,736 | B2 | 4/2008 | Whittle et al. |
| 2006/0111578 | A1* | 5/2006 | Arhancet ........... A21D 13/0074 554/8 |
| 2006/0147556 | A1 | 7/2006 | Brewer |
| 2017/0015936 | A1* | 1/2017 | Kinney .............. B01D 11/0203 |
| 2017/0015937 | A1 | 1/2017 | Kinney et al. |

OTHER PUBLICATIONS

Arab-Baraghi et al, "A Simple Method for Preparation of Polymer Microcellular Foams by In Situ Generation of Supercritical Carbon Dioxide From Dry Ice" Abstract, Springer Link, Iranian Polymer Journal 2014, vol. 23, Science and Research Branch, Department of Polymer, Department of Polymer Engineering, Islamic Azad University, 1 total pages.

A Close Look at Supercritical Carbon Dioxide CO2—You Tube, http://youtube.com/watch?v=-gCTKteN5Y4, Oct. 21, 2014, 4 total pages.

Simple Minded Sub and SFE CO2 Extractor, simple-minded-dry-ice-sfe-1-12.jpg (600×409), https://skunkpharmresearch.files.wordpress.com/2012/05/simple-minded-dry-ice-sfe-1-12.jpg, Oct. 12, 2014, 1 total page.

Supercritical carbon dioxide, Supercritical carbon dioxide—Wikipedia, the free encyclopedia, http://en.wikipedia.org/wiki/Supercritical_carbon_dioxide, Oct. 10, 2014, 5 total pages.

Skunk Pharm Research LLC Research and Development One Safety Meeting at a Time, DIY CO2 Extraction?, Oct. 7, 2014, 13 total pages.

Plant Oil Extraction: The EnJYN (At Home CO2 Extractor), http://jyndustriez.blogspot.com/p/my-supercritical-extractor-and-method.html, Apr. 30, 2014, 5 total pages.

JYNdustriez LLC for Oilmakers, DIY CO2 Extraction, http://jyndustriezllc.com/diy-co2-extraction-crumble-wax-shatter/, Apr. 30, 2014, 9 total pages.

* cited by examiner

APPARATUS AND METHOD FOR EXTRACTING ORGANIC COMPOUNDS FROM PLANT MATERIAL USING CARBON DIOXIDE

RELATED CASES

The present application claims the benefit of Provisional Patent Application Ser. No. 62/106,028, filed on Jan. 21, 2015, and entitled "Apparatus and Method for Extracting Organic Compounds from Plant Material Using Carbon Dioxide" by Lisa F. Kinney et al., which application is hereby incorporated by reference herein for all that it discloses and teaches.

FIELD OF THE INVENTION

The present invention relates generally to extracting organic compounds from plant material and, more particularly, to extracting organic compounds from plant material using supercritical carbon dioxide or subcritical carbon dioxide liquid generated from dry ice in a sealed container, and separating the dissolved compounds from the carbon dioxide outside the chamber.

BACKGROUND

Essential oils and other desirable or useful materials found in botanicals including herbs, fruits, flowers, leaves, skins, stems, stalks, roots, seeds, nuts and berries, have historically been extracted using organic solvents, steam distillation, and/or pressing. For example, butane hash oil (BHO) is the essential oil from the cannabis plant extracted using n-Butane as a solvent and a vacuum oven. Each of these extraction methods has undesirable features: for example, incomplete extraction; the necessity of expensive, toxic, caustic, or flammable solvents having significant disposal costs; damage to the extracted constituents from heat; the inability to specifically target desired for constituents for extraction; difficulty in obtaining solvents for home or small business use; and the need for expert personnel and complex apparatus for performing extractions. Additionally use of extraction solvents such as propane, butane, pentane and hexane, or mixtures of alcohols requires processing beyond the extraction process in order to ensure that the extracted materials are safe for use or consumption.

More recently, supercritical liquids have been used for extracting botanicals, largely alleviating problems associated with heating, the need for expensive, toxic, caustic or flammable solvents having significant disposal costs, solvent availability, and the need for expert personnel. Extractions using subcritical/supercritical carbon dioxide have the advantage that $CO_2$ is non-toxic; non-flammable; operates around room temperature; inexpensive; and environmentally friendly. Further, the extraction efficiency of carbon dioxide for certain compounds may be adjusted by increasing or decreasing pressures and/or temperatures of the carbon dioxide, thereby permitting extractions having varying levels of certain compounds. For example, concentrations of less-desirable plant constituents, such as chlorophyll, can be reduced without secondary processing, by choosing conditions which reduce their solubility in subcritical or supercritical carbon dioxide.

SUMMARY OF THE INVENTION

Embodiments of the present invention overcome the disadvantages and limitations of the prior art by providing an apparatus and method for selectively extracting organic compounds from plant material.

Another object of embodiments of the invention is to provide an apparatus and method for extracting organic compounds from plant material without the need for caustic and flammable solvents, and complex apparatus.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the apparatus for extracting organic compounds from plant material, hereof includes: a chamber adapted for receiving solid carbon dioxide, and having an opening; a removable cover for providing a gas-tight seal for the opening; a heating element adapted for warming the chamber; a porous container adapted to be placed in the chamber for holding the plant material and permitting the plant material to be contacted by subcritical and supercritical carbon dioxide; a manual vent valve for permitting gases to exit the chamber; a valve for permitting supercritical and subcritical carbon dioxide containing extracted organic compounds to exit the chamber, and a separator for receiving supercritical and subcritical carbon dioxide containing extracted organic compounds from the chamber and for separating the extracted organic compounds from the supercritical and subcritical carbon dioxide.

Benefits and advantages of embodiments of the present invention include, but are not limited to, providing an apparatus for extracting organic compounds from biomaterial without requiring flammable solvents, and wherein the extracted compounds are readily collected from the pressure chamber.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 5A is a schematic representation of a bottom view of the embodiment of the extraction apparatus shown in FIG. 4, hereof, while

DETAILED DESCRIPTION

Briefly, the present invention includes an apparatus for extracting organic compounds from plant materials using subcritical or supercritical carbon dioxide. The apparatus has a sealable pressure chamber into which carbon dioxide dry ice and the plant materials are inserted, the pressure chamber, once sealed, self-pressurizing as the container and contents are warmed to a chosen temperature, converting the solid $CO_2$ to liquid, or to a super-critical fluid as the temperature and pressure rise above the Critical Point. The chamber can be rotated when subcritical $CO_2$ liquid is employed to improve mixing between the liquid and the plant material. After a suitable extraction time, the carbon dioxide solvent containing the extracted material may be vented leaving extracts behind, or directed into a separator such that the carbon dioxide and extracted material can be effectively separated.

In existing supercritical or subcritical carbon dioxide extractions, a certain quantity of viscous and waxy extracted materials may remain in the chamber and valves after the carbon dioxide solvent is warmed, vaporized, and allowed to exit the chamber. These materials are difficult to remove from the apparatus without the use of solvents or heat. This problem may be in part overcome with recirculating systems. However, in the present apparatus, the separator permits extracted materials to be separated from the carbon dioxide in an efficient manner, with little extracted material remaining in the extraction chamber.

As stated above, subcritical/supercritical carbon dioxide possesses useful properties as an extracting media for botanical and other constituents. In particular, the density of the carbon dioxide solvent may be varied to achieve selective separations by adjusting the temperature and pressure of the carbon dioxide solvent.

Figure 1:
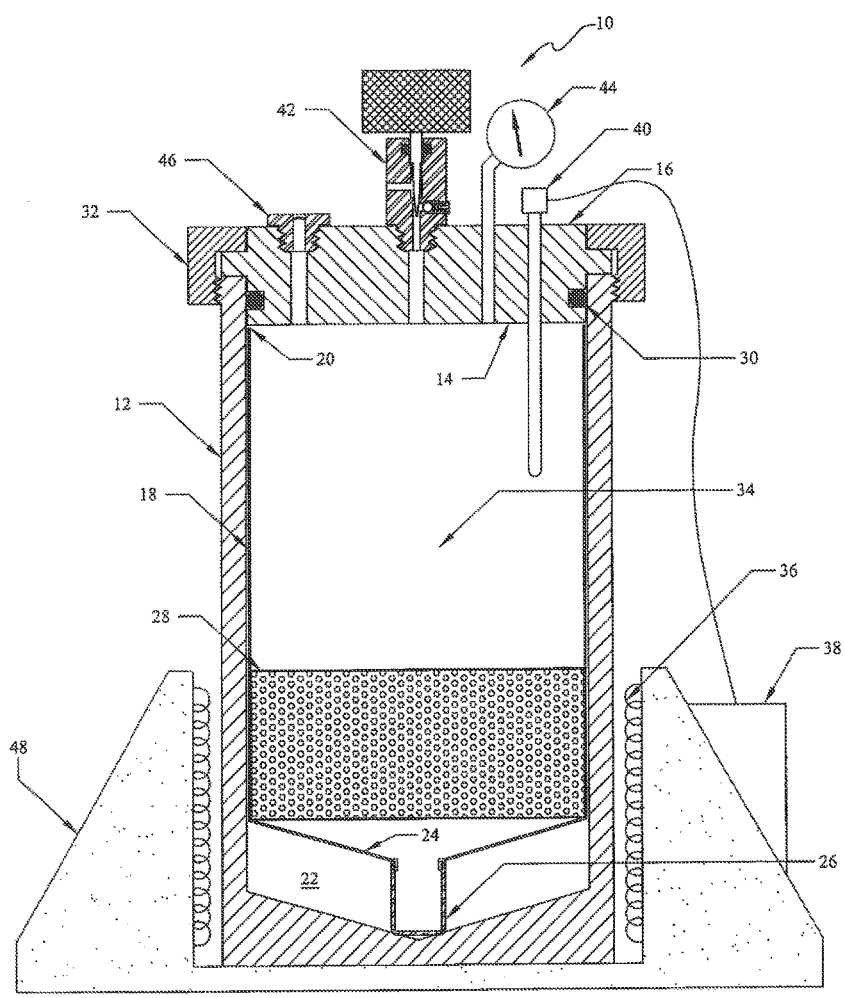
FIG. 1 is a schematic representation of the side view of an embodiment of the extraction apparatus of the present invention, illustrating the high-pressure chamber hereof, shown as a cylindrical vessel, into the interior portion of which an inner sleeve having an opening at one end and into which dry ice may be placed, and a tapered end opposite the open end at the end of which a collection vial is disposed, a porous insert for holding plant material located within the cylinder, a pressure lid adapted for maintaining pressure in the chamber and for providing access to the feed insert and the collection vessel, and an external heating element.

Reference will now be made in detail to the present embodiments of the invention, examples of which are illustrated in the accompanying drawings. In the FIGURES, similar structure will be identified using identical reference characters. It will be understood that the FIGURES are for the purpose of describing particular embodiments of the invention and are not intended to limit the invention thereto. Turning now to FIG. 1, a schematic representation of the side view of an embodiment of extraction apparatus, 10, of the present invention, illustrating high-pressure chamber or vessel, 12, shown as a cylindrical vessel having an open end, 14, reversibly sealed by pressure lid, 16. Removable cylindrical sleeve, 18, having an opening at one end, 20, disposed in the interior volume, 22, of chamber 12 has tapered portion, 24, opposite open end 20 at the end of which removable collection vial, 26, is located. Porous insert, 28, for holding plant or other material to be processed is also disposed in chamber 12 within sleeve 18. Pressure lid 16 is adapted for maintaining pressure in chamber 12, utilizing O-ring seal, 30, and is removable for providing access to feed insert 28 and sleeve 18 in chamber 12, by unscrewing threaded retaining ring, 32. Clearly, there are many ways in which chamber 12 can be reversibly pressure sealed.

A chosen quantity of dry ice is placed in volume, 34, of chamber 12 for generating liquid carbon dioxide once sealed in the chamber. External heating element, 36, is operated by temperature controller, 38, and temperatures internal to pressure vessel 12 are measured by temperature sensor, 40. Combined pressure relief and vent valve, 42, and pressure sensor, 44, are utilized to control the pressure in chamber 12. As mentioned hereinabove, subcritical carbon dioxide and supercritical carbon dioxide having chosen density can be generated by controlling the temperature and pressure of chamber 12. Safety burst disk, 46, provides system overpressure relief.

Base, 48, supports chamber 12 in an upright position. However, as will be described hereinbelow, rotating or shaking chamber 12 may improve extraction efficiency and time.

Figure 2:
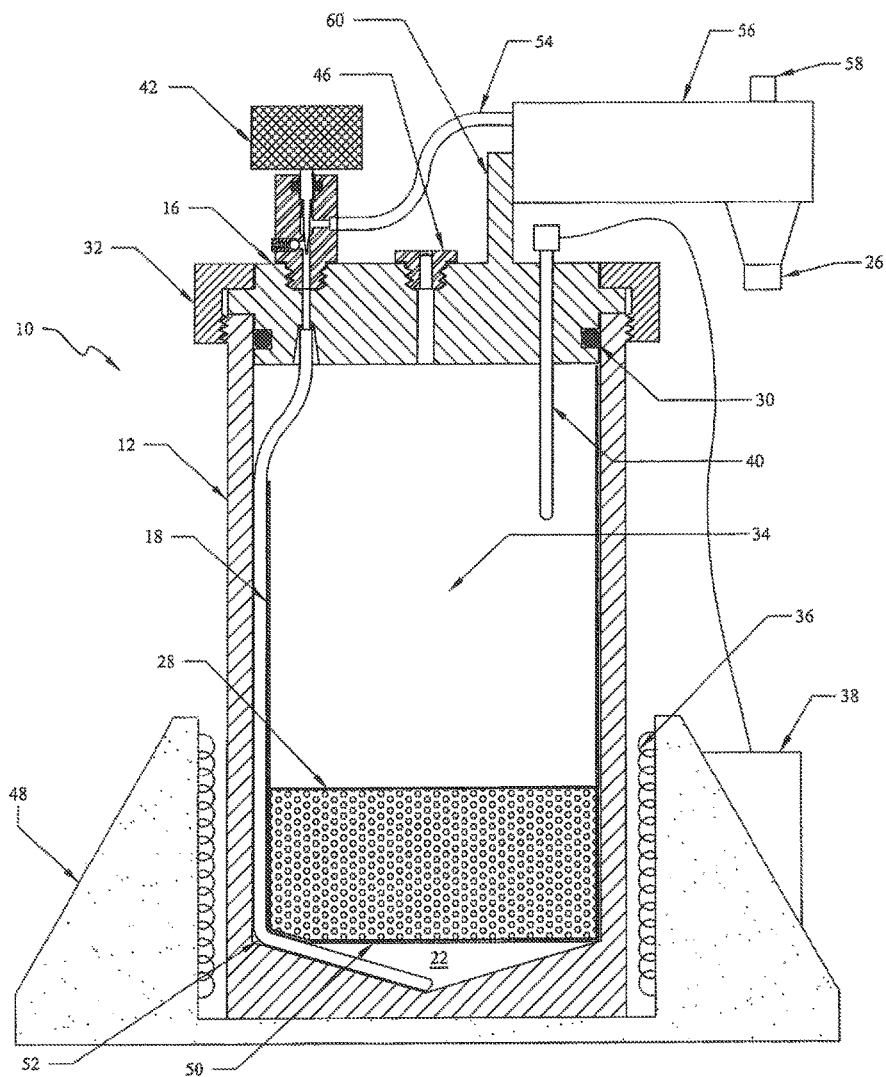
FIG. 2 is a schematic representation of the side view of another embodiment of the extraction apparatus of the present invention, illustrating some common elements shown in FIG. 1 hereof, wherein the inner sleeve has a porous bottom adjacent to the porous material holder, including further, a siphon tube which extends to the bottom of the interior portion of the chamber and connecting to the manual combination pressure relief and discharge metering valve for directing fluid under pressure in the chamber through a detachable combination vaporizer and gas product separator, such that the extracted material is collected in a product collection vial, and the carbon dioxide gas is vented to atmosphere or collected.

FIG. 2 is a schematic representation of the side view of another embodiment of the extraction apparatus of the present invention, illustrating inner sleeve 18 having a porous bottom, 50, adjacent to the porous material holder 28, and siphon tube, 52, which extends to the bottom of the interior portion of chamber 12. Siphon tube 52 is in fluid communication with combination pressure relief and discharge metering valve 42, and directs fluid under pressure in chamber 12 through tube, 54, to detachable combination vaporizer and gas product separator, 56, such that the extracted material is collected in product collection vial 26 and the carbon dioxide gas is vented to the atmosphere through gas discharge vent, 58, or collected. Separator 56 may be detachably mounted to flange, 60, integrally formed with or otherwise attached to pressure cap 16.

Figure 3:
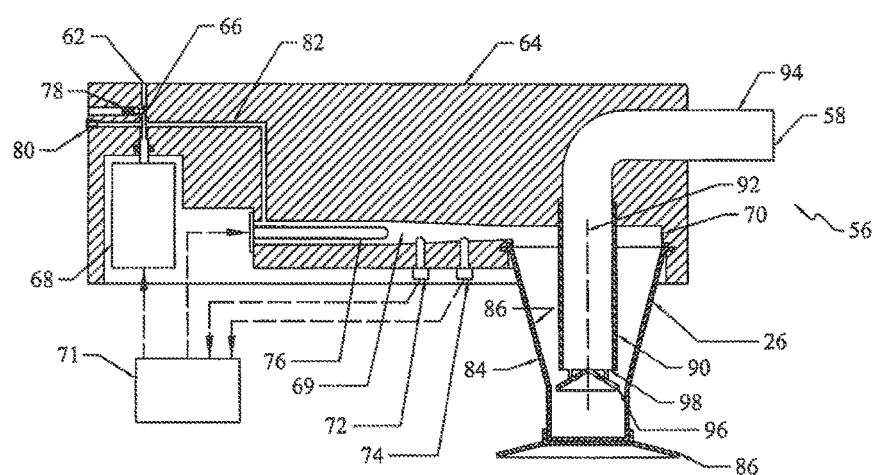
FIG. 3 is a schematic representation of a side view of an embodiment of a gas/product separation apparatus shown in FIG. 2 hereof adapted for direct fluid communication with the pressure chamber, and illustrating a motorized flow metering valve.

FIG. 3 is a schematic representation of a side view of a cyclone separator embodiment of gas/product separation apparatus 56 shown in FIG. 2 hereof, adapted for direct fluid communication with chamber 12 through inlet orifice, 62, formed in body, 64. Discharge valve 42 in FIG. 2 is replaced by flow metering valve, 66, driven by motor, 68, for directing fluid into vaporization chamber, 69, which leads into separator cylindrical inlet section, 70. Motor 68 is directed by controller, 71, with input from separator pressure sensor, 72, and separator temperature sensor, 74. Heating element, 76, in heating chamber is also operated by controller 71.

Pressure relief valve, 78, provides overpressure venting for chamber 12, and flushing/cleaning port, 78, provides access to fluid line, 82, through which metered fluid passes from chamber 12, passed heater 76, to cyclone separator, 84, which includes: collection vial, 26, having cone-shaped interior, 86, and stand, 88, formed integrally therewith, or attached thereto, exhaust tube, 90, disposed longitudinally along centerline, 92, of vial 26, and in fluid communication with discharge vent tube, 94, cone-shaped separator hat, 96, disposed within vial 26 supported by exhaust tube 90, and spaced-apart from open end, 98, thereof.

Figure 4:
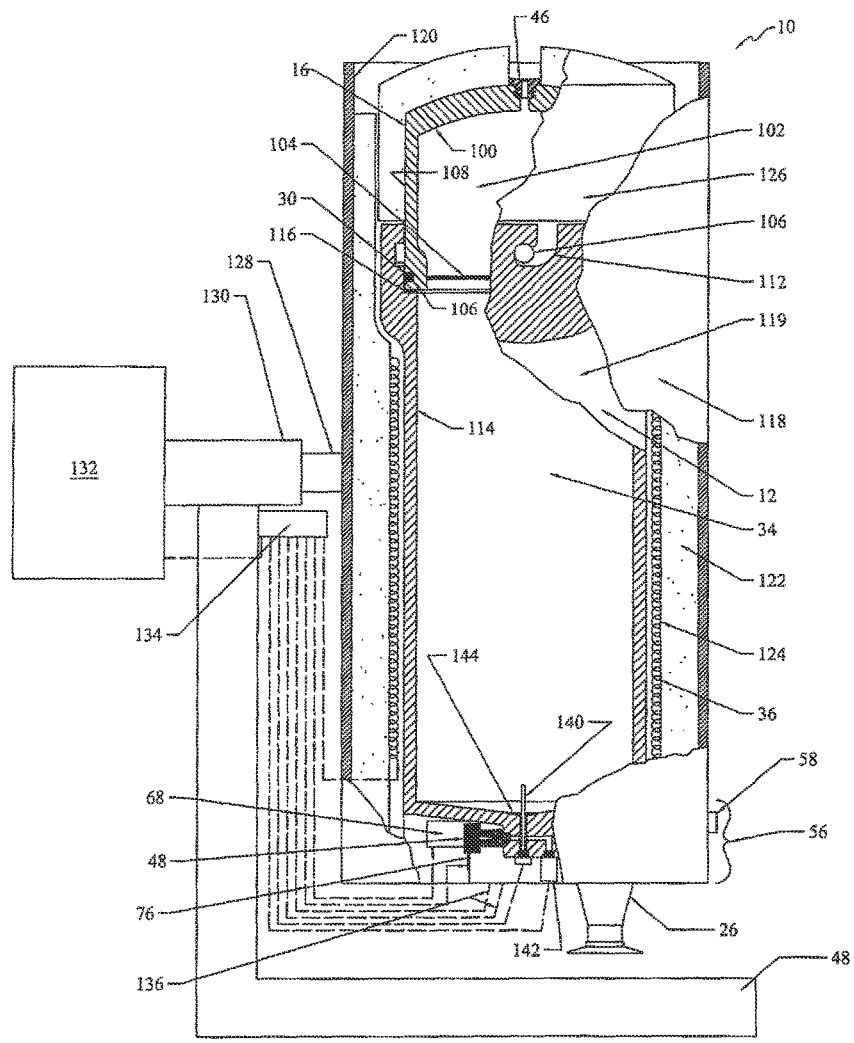
FIG. 4 is a schematic representation of a side view of a third embodiment of the extraction apparatus of the present invention showing a gas/product separation apparatus integral with the high-pressure chamber and having a motorized flow metering valve, a chamber jacket for supporting, heating and insulating the chamber and for permitting the chamber to be rotated manually or by utilizing a motor to improve extraction efficiency, wherein the material holder is located in a volume in the cap of the chamber, and the separation apparatus is disposed on the bottom of the chamber, such that a siphon tube is unnecessary.
Figure 5A:
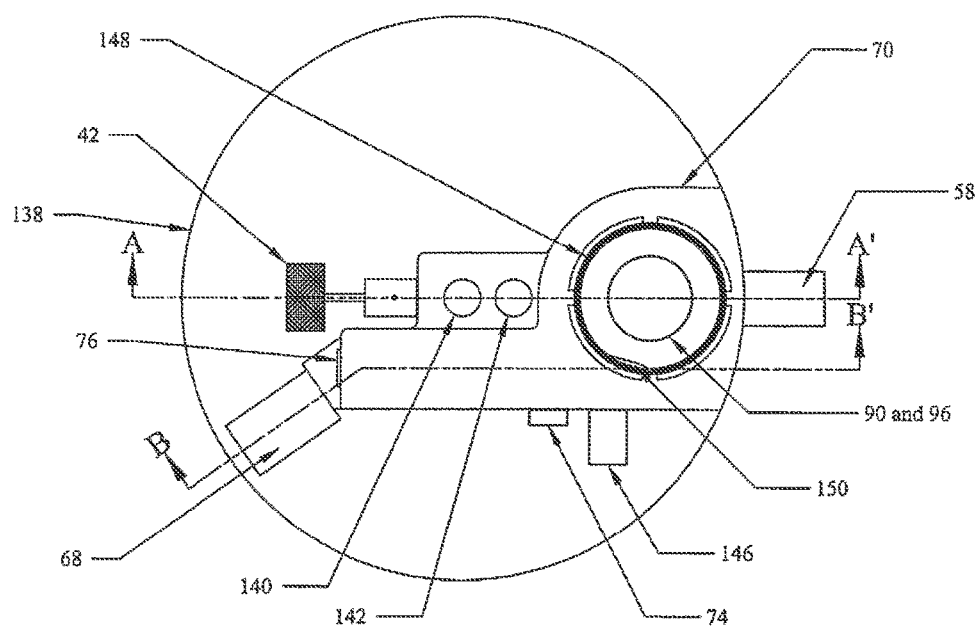
Figure 5B:
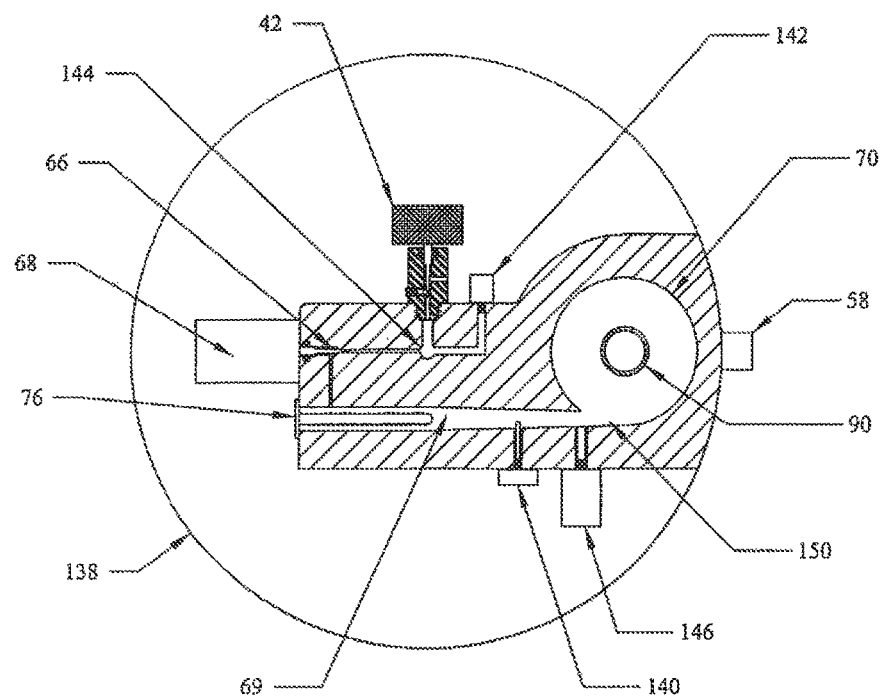
FIG. 5B is a schematic representation of a bottom sectional view of the embodiment of the extraction apparatus shown in FIG. 5A, hereof, with some of the parts having been relocated to improve understanding of the functioning of the combination vaporizer and gas product separator.
Figure 6:
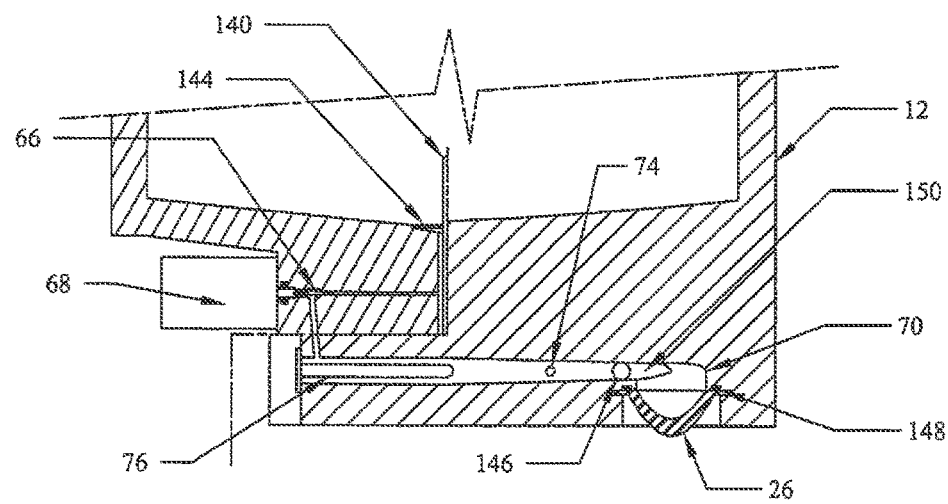
FIG. 6 is a schematic representation of cross section BB' identified in FIG. 5A, hereof.
Figure 7:
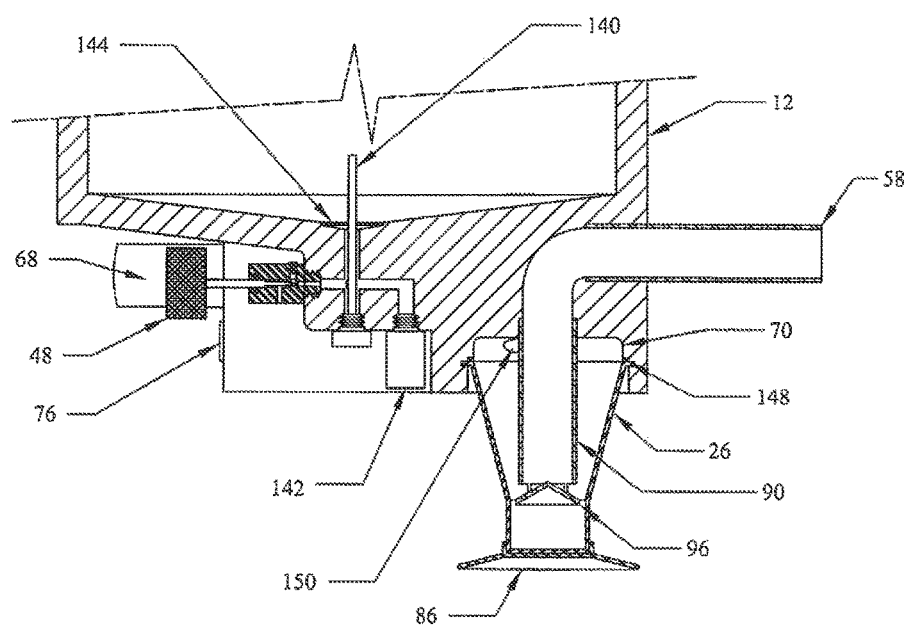
FIG. 7 is a schematic representation of cross section A-A' identified in FIG. 5B hereof.

In operation, fluid from chamber 12 enters separator 56 through inlet 62, which may be in fluid communication with tube 54 illustrated in FIG. 2, or directly with chamber 12 as shown in FIG. 4, hereinbelow, the flow rate of the fluid being controlled by flow metering valve 66. After passing through tube 82 the fluid flows over heating element 76, wherein supercritical carbon dioxide and subcritical carbon dioxide liquid bearing extracted material is vaporized and the resulting gas stream with the aerosol extracted materials is directed tangentially into the wide, upper portion of conical interior 86 of collection vessel 26. While spiraling downward toward the narrower portion of interior of conical vessel 26, the aerosol materials in the gas stream drift radially outward due to centripetal force and are collected on conical wall 86 of collection vessel 26. Less viscous constituents of the collected material will flow downward along conical wall 86 under the influence of gravity and the downward component of the friction drag of the gas stream, past cyclone separator hat 96 and be collected in the lower cylindrical portion of vial 26. Heavier, more viscous constituents of the collected materials will remain on conical walls 86. The carbon dioxide gas stream will encounter cyclone separator hat 96 at the bottom of conical section 86, and be deflected upward to spiral through inlet opening 98 of exhaust tube 90. The vaporized gas then passes the interior of exhaust tube 90, and is vented to the atmosphere through vent tube 94. Present separator 56 prevents extracted material from remaining in chamber 12 and provides an effective separation from the carbon dioxide solvent.

FIG. 4 is a schematic representation of a side view of a third embodiment of extraction apparatus 10 of the present invention showing an embodiment of gas/product separation apparatus, 56, integral with high-pressure chamber 12. Plant material container 28 is formed by pressure vessel cap 16 having wall, 100, which forms interior volume, 102, and snap-in porous material cover, 104. O-ring 30 is disposed in a circumferential O-ring groove, 106, formed in the exterior surface, 108, of wall 100. Wall 100 also has a chosen number of outwardly facing bayonet attachment lugs, 110, for example 6 or 8, disposed on a circumference on outer surface 108 thereof, adapted for engaging corresponding hooked bayonet slots, 112, formed in wall, 114, of pressure vessel 12. Bayonet attachment spring, 116, generates a force between cap 16 and chamber 12 for assisting the reversible seating of attachment lugs 110 in slots 112. Spring 116 may be an elastomeric spring. Separator 56 is shown attached to chamber 12, and will be described in more detail hereinbelow.

Pressure Vessel assembly jacket, 118, which surrounds pressure vessel assembly, 119, and may be fabricated from metal or other sturdy material, has cylindrical interior surface, 120, onto which is attached cylindrical insulating material, 122, adapted to receive chamber 12, and onto a portion of interior surface, 124, of which, heating element 36 is attached, whereby wall 114 of chamber 12 may be heated to a desired temperature. Cap insulation, 126, surrounds the exterior portion of cap 16, and is adapted to slide into insulated jacket 118. Once assembled, chamber 12 and cap 16 may be slid into assembly jacket 118, which is attached by axle, 128, through rotary bearing, 130, supported by stand 48, to motor, 132, for rotating jacket 118 during the extraction process.

Motor 132 and heating element 36, as well as the elements in separator 56 are activated by controller, 134, through electrical connections, 136, based on programmed input from the user and information gathered by the sensors in separator 56, as will be explained in more detail hereinbelow.

FIG. 5A is a schematic representation of a bottom view of the embodiment of extraction apparatus 10 shown in FIG. 4, hereof, illustrating elements of separator 56 integral with bottom, 138, of chamber 12. Shown are chamber temperature sensor, 140, and chamber pressure sensor, 142, which are in fluid contact with chamber 12 through screened liquid outlet, 144, not shown in FIG. 5A, and vaporization chamber temperature sensor 74, and aerosol droplet size and velocity sensor, 146. Cyclone separator member 84 is shown with conical product collection cup 26 removed, illustrating cup sealing ring, 148, and tangential inlet jet opening, 150.

FIG. 5B is a schematic representation of a bottom sectional view of the embodiment of the extraction apparatus shown in FIG. 5A, hereof, with some of the parts having been relocated to improve understanding of the functioning of the combination vaporizer and gas product separator.

FIG. 6 is a schematic representation of cross section B-B' identified in FIG. 5A, hereof.

FIG. 7 is a schematic representation of cross section A-A' identified in FIG. 5A hereof.

As stated, separator 56 separates the dissolved product from the liquid $CO_2$ solvent, and an integral pressure relief valve is provided with manual vent valve 48 to protect pressure vessel 12 from overpressure, and allows manual depressurization of pressure vessel 12, if necessary. The elements of separator 56 may be integrated into pressure vessel 12 or mounted separately, and accessed using external tubing, as illustrated in FIG. 2 hereof. Product collection vial 26, which may be disposable, forms the lower cone of the cyclone separator 84.

Separator 56 may be operated automatically by process controller 134 with several sequences being anticipated; that is, the order of the various steps may be varied depending on various circumstances.

Cap 16 is removed by pushing down on the cap against tension spring 116, turning the cap counter-clockwise until attachment lugs 106 clear detents 112. The lug and detent combination prevents cap 16 from rotating when pressure vessel 12 is pressurized, and separating the cap from the pressure vessel body. Once the cap is removed, snap-in feed stock chamber porous retaining cover 104 is removed by pulling the cover out over spring detents, not shown in FIG. 4. The material to be processed is placed in the chamber and the cover is snapped into place. Open cavity 34 of pressure vessel is then filled with a chosen quantity of carbon dioxide dry ice, and the cap is reattached to the pressure vessel by pushing down on the cap and turning the cap clockwise past the detents until the attachment lugs seat in their sockets.

Turning to FIGS. 4-7, the initial conditions and position for charging extraction apparatus 10, are that pressure vessel 12 is empty, at atmospheric pressure and room temperature, and vertically or near vertically oriented by motor 132 for charging, wherein cap/feed stock material chamber 16 is uppermost. Vaporization heater 76 is off, manual vent valve 48, if present, is closed, and motorized liquid flow metering valve 66 is open. Product collection vial 26 is installed on gas/oil separator 56 on the lower part of pressure vessel 12. After filling interior volume 102 with botanical material, replacing snap-in porous material cover 104, filling pressure vessel 12 with carbon dioxide dry ice, and sliding and latching cap 16 into pressure vessel 12, pressure vessel assembly 119 is rotated such that cap 16 is below vessel 12, and the motorized flow metering valve 66 is left open for between approximately 15 s and about 30 s, to vent the air displaced by the heavier $CO_2$ from the pressure vessel. Motorized flow metering valve 66 is then closed and kept closed until the pressure vessel is again rotated to the charge position at the end of the processing cycle. Note that flow metering valve 66 is a positive shutoff valve. Pressure vessel heating element 36 may be activated at this time to pressurize the vessel, whereby liquid $CO_2$ or supercritical $CO_2$ is formed, depending on the temperature and pressure attained in pressure vessel 12.

During processing, the pressure vessel assembly 119 may be oscillated one or more times between the charge and processing positions by controller 134 to increase extraction efficiency by mixing any liquid carbon dioxide with the botanical material. Such oscillation may not be required if supercritical $CO_2$ is utilized for the extraction. In general, the solubility of a substance in a dense gas, such as a supercritical fluid, increases as the density increases as a function of temperature and pressure. Therefore, as the temperature/pressure of the supercritical fluid is reduced, a phase separation occurs with dense liquid containing the bulk of the extract and the gas containing very little. Droplets of supersaturated liquid could then be formed as a result of this process. If this such droplets occur within the feed stock material or on the side walls of the chamber, some of the extract may be deposited. Thus, "rinsing" the feedstock material and the chamber walls after a supercritical extraction and prior to separating the product from the liquid $CO_2$ may be beneficial.

After a chosen processing time, the separation cycle begins, wherein controller 134 directs vaporization heater 76 to preheat vaporization chamber, 69, until a specified temperature is reached, then slowly opens liquid flow metering valve 66, to adjust the flow rate, whereby the specified temperature is maintained in the vaporization chamber. To optimize the efficiency of separator 56, controller 134 may also be used to adjust the temperature and flow rate through vaporization chamber 69, such that the velocity and droplet size sensed by aerosol droplet size and velocity sensor 146 most closely matches the design parameters for separator 56 to maximize the separation efficiency and minimize the time for performing the separation process.

A cyclone separator relies on the force from the centripetal acceleration of the entrained particle/aerosol mass to overcome aerodynamic drag and any turbulence present in the gas stream. Therefore, measuring the particle size and velocity provides information to regulate the liquid flow into the vaporizer to prevent turbulence and to optimize the extraction efficiency of the cyclone separator. The volume of liquid being converted into gas will influence the gas stream velocity, the entrained aerosol velocity (typically less than the gas stream velocity), and the resulting aerosol droplet size (probably smaller). In general, the smaller the droplet size the greater the surface area to volume ratio, and the lower the radial terminal velocity induced by centripetal acceleration. Lower radial terminal velocities require longer residence time for the droplets to migrate to the outer walls of the cyclone cone. Increasing gas stream velocity will both increase the aerosol droplet velocity and the associated centripetal acceleration, but will decrease the residence time and may introduce turbulence, which may decrease separation efficiency. Decreasing the liquid flow into the vaporizer will lower the gas stream velocity, increase residence time, and probably increase aerosol size, but will decrease centripetal acceleration. Thus, the optimum liquid flow rate is a complex optimization problem that depends on the properties of the aerosol droplets, the geometry of the cyclone separator, the velocity of the gas stream and particles, and the particle size. Information from the particle size and velocity sensor is necessary, but not sufficient, for making the calculations for an optimization feedback loop.

When the $CO_2$ liquid is exhausted from pressure vessel 12, the temperature of vaporization chamber 69 will begin to rise and liquid flow metering valve 66 is fully opened by controller 134 using motor servo motor 68. Full opening of the liquid flow metering valve and reduction of the pressure in the pressure vessel to atmospheric pressure signals the completion of the separation cycle, and vaporization heater 76 is de-energized, liquid flow metering valve 66 remaining open. If the pressure in pressure vessel 12 does not return to atmospheric pressure between approximately 1 and about 2 min., an error signal is generated. Once an error signal is generated, an operator must reduce the residual pressure in pressure vessel 12 using manual vent valve 48 to at or near atmospheric pressure before the pressure vessel can be opened, because higher residual pressure in pressure vessel 12 will prevent the bayonet attachment lugs 106 on the cap from being rotated past the detents in pressure vessel bayonet slots 112.

After removal of the expended biomaterial, apparatus 10 is ready for another extraction/separation. Cone vial 26 may be detached for accessing the extracted material, and replaced with a new vial, if desired.

Having generally described the apparatus and method, the following EXAMPLE provide additional details.

EXAMPLE

Chamber 12 may develop significant pressures if the carbon dioxide liquid volume is greater than that of the chamber as carbon dioxide passes through the subcritical liquid state on the way to the supercritical state. Calculations on the sizing and charging of pressure vessels for preventing the vessels from being completely filled with $CO_2$ liquid and becoming over-pressurized, follow, assuming a factor of safety (FOS) of 1.25 (note that 1.15 is the minimum FOS used for most engineering projects), a minimum $CO_2$ liquid density of $\rho_{CO2Lmin}$=0.680 kg/l @ ~30° C. and 80 bar (1,180 psi); and a solid density of $\rho_{CO2S\text{-}78,5C}$=1.562 kg/l @ −78.5° C. and 1 bar. Assuming further a typical Botanical or Plant Material Density for cannabis plants of $\rho_B$=0.312 kg/l; a THC solubility, $S_{CO2}$=0.3%; a THC extraction percentage, $\eta_P$=12%, and a mass ratio of dry ice to botanical material, $R_m$=40 kg of $CO_2$/kg of Botanical Material (extraction percentage of THC in the botanical material, 12%, (Units of kg[THC]/kg[botanical material]) divided by THC solubility in CO2, 0.03% (Units of kg[THC]/kg[CO2]); leaving units of kg[CO2]/kg[botanical material]), and the pressure vessel charge volumes per kilogram of Botanical material, including the FOS are:

$V_{BM}$=3.21 l; Volume of botanical material;

$V_{DI}$=25.62 l; Volume of solid $CO_2$ (dry ice);

$V_{HS}$=41.52 l; Volume of required head space (with FOS); and $V_{tot}$=70.3 l; Total Volume, from which the Percentage Charge Volumes (Including FOS) are:

$V_{\%BM}$=4.6%; Percentage volume of botanical material;

$V_{\%DI}$=36.4%; Percentage volume solid $CO_2$ (dry ice); and
$V_{\%HS}$=59.0%; Percent volume of required head space (with FOS).

For a 1 l pressure vessel, the mass of botanical material is 14 g; the mass of dry ice is 569 g; and the mass of product is 2 g.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for extracting organic compounds from plant material, comprising:
   a chamber capable of being pressurized;
   a pressure lid for providing a gas-tight seal for the opening, and for maintaining a chosen pressure within said chamber;
   a collection vial;
   a removable sleeve disposed in said chamber having an opening at one end for receiving solid carbon dioxide, and a tapered portion opposite the open end adapted to receive said collection vial;
   a first heating element adapted for heating said chamber;
   a temperature sensor;
   a pressure sensor;
   a porous container adapted to be placed in said sleeve for holding the plant material and for permitting the plant material to be contacted by liquid carbon dioxide or supercritical carbon dioxide; and
   a vent valve for permitting gaseous carbon dioxide to exit said chamber.

2. The apparatus of claim 1, further comprising:
   a support having an interior portion adapted for receiving and holding said chamber, and an exterior portion;
   an axle attached to the exterior portion of said support;
   a rotary bearing adapted to receive said axle; and
   a stand adapted for supporting said rotary bearing into which said axle is inserted;
   whereby said support bearing said chamber is rotated.

3. An apparatus for extracting organic compounds from plant material, comprising:
   a chamber capable of being pressurized having an opening;
   a pressure lid for providing a gas-tight seal for the opening, and for maintaining a chosen pressure within said chamber;
   a collection vial;
   a removable sleeve disposed in said chamber having an opening at one end for receiving solid carbon dioxide, and a tapered portion opposite the open end, adapted to receive said collection vial;
   a first heating element adapted for heating said chamber;
   a temperature sensor;
   a pressure sensor;
   a porous container adapted to be placed in said sleeve for holding the plant material and for permitting the plant material to be contacted by liquid carbon dioxide and supercritical carbon dioxide;
   a vent valve for permitting carbon dioxide and supercritical carbon dioxide the chamber.

4. The apparatus of claim 3, further comprising:
   a support having an interior portion adapted for receiving and holding said chamber, and an exterior portion;
   an axle attached to the exterior portion of said support;
   a rotary bearing adapted to receive said axle; and
   a stand adapted for supporting said rotary bearing into which said axle is inserted;
   whereby said support bearing said chamber is rotated.

* * * * *